United States Patent
Kondo

(10) Patent No.: US 7,508,140 B2
(45) Date of Patent: Mar. 24, 2009

(54) PLASMA REACTOR

(75) Inventor: Atsuo Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 238 days.

(21) Appl. No.: 11/704,201

(22) Filed: Feb. 9, 2007

(65) Prior Publication Data

US 2007/0223641 A1 Sep. 27, 2007

(30) Foreign Application Priority Data

Mar. 22, 2006 (JP) ............................. 2006-078625

(51) Int. Cl.
*H01J 7/24* (2006.01)
*H05B 31/26* (2006.01)
*H05B 11/00* (2006.01)

(52) U.S. Cl. ..................... 315/111.21; 315/111.71; 422/906

(58) Field of Classification Search ............ 315/111.21, 315/111.31, 111.41, 111.51, 111.71; 422/906
See application file for complete search history.

(56) References Cited

U.S. PATENT DOCUMENTS

| | | | |
|---|---|---|---|
| 6,955,041 B2 | 10/2005 | Takeshima et al. | |
| 7,018,553 B2 * | 3/2006 | Liu et al. | 216/60 |
| 2005/0037500 A1 * | 2/2005 | Ciovacco et al. | 436/3 |
| 2005/0148188 A1 * | 7/2005 | Park | 438/694 |
| 2008/0100223 A1 * | 5/2008 | Lewington et al. | 315/111.21 |

FOREIGN PATENT DOCUMENTS

| JP | A 2002-155731 | 5/2002 |
|---|---|---|
| JP | A 2004-92589 | 3/2004 |
| JP | B2 3551156 | 5/2004 |

* cited by examiner

Primary Examiner—Douglas W. Owens
Assistant Examiner—Minh Dieu A
(74) Attorney, Agent, or Firm—Oliff & Berridge, PLC

(57) ABSTRACT

A plasma reactor including a plasma generating electrode which includes a plurality of unit electrodes hierarchically layered at specific intervals, a casing in which the plasma generating electrode is disposed, and a power supply which applies a voltage to the unit electrodes, generating plasma in a space formed between the unit electrodes by applying a pulse voltage between the unit electrodes from the power supply, and capable of processing exhaust gas introduced into the space through reaction, the plasma reactor further including a light-transmitting section formed in the casing for externally detecting light emitted by the plasma, light detection means capable of detecting light emitted by the plasma through the light-transmitting section, and control means for controlling electric energy applied to the unit electrodes depending on intensity of light detected by the light detection means.

5 Claims, 2 Drawing Sheets

PLASMA REACTOR

BACKGROUND OF THE INVENTION

1. Field of the Invention

The present invention relates to a plasma reactor. In particular, the present invention relates to a plasma reactor which can effectively process exhaust gas without supplying energy exceeding a necessary level.

2. Description of Related Art

A silent discharge occurs when disposing a dielectric between two electrodes and applying a high-voltage alternating voltage or a periodic pulse voltage between the electrodes. Active species, radicals, and ions are produced in the resulting plasma field to promote reaction and decomposition of gases, particulate matter, and the like. A method has been proposed in which the above phenomenon is utilized to process particulate matter (PM) produced from an internal combustion engine such as a diesel engine.

For example, a plasma reactor using parallel plates, a concentric circle plasma reactor, a packed-bed plasma reactor in which pellets are placed therein, and the like have been proposed.

The amount of PM produced from an internal combustion engine changes from moment to moment depending on the operation state and the like. Therefore, it is difficult to process PM using the plasma reactor while always supplying energy optimum for the amount of PM produced. For example, a method has been proposed in which the amount of PM produced corresponding to the engine speed and the torque is confirmed in advance, and PM is processed using the plasma reactor while supplying energy corresponding to the engine speed and the torque during the actual operation. However, since the amount of PM produced corresponding to the engine speed and the torque changes depending on the intake conditions, the engine temperature, and the like, this method cannot necessarily supply an optimum amount of energy during the actual operation. It is necessary to supply energy greater than the actually required energy in order to reliably process PM.

A method has also been disclosed in which detection means for temperature, $NO_x$, oxygen, and the like are disposed on the upstream side and the downstream side of a plasma processing device disposed in the exhaust system during operation of an internal combustion engine to detect the exhaust gas state, and the amount of power supplied to the plasma processing device is controlled based on the detected values (see patent document 1, for example). A method has also been disclosed in which the concentration of particulate matter contained in exhaust gas flowing into a plasma generation device is detected by concentration detection means such as a smoke sensor or a light scattering particle counter, and the operation of the plasma generation device is controlled based on the detected values (see patent document 2, for example). Another method has been disclosed for an exhaust gas purifying device for an internal combustion engine in which a plasma generation device is disposed in an exhaust gas passage, the method including controlling the alternating voltage frequency and/or voltage of the plasma generation device based on data obtained by an exhaust gas temperature sensor and an air/fuel (A/F) ratio sensor (see patent document 3, for example).

[Patent document 1] JP-A-2002-155731
[Patent document 2] JP-A-2004-92589
[Patent document 3] Japanese Patent No. 3551156

SUMMARY OF THE INVENTION

The above methods aim at controlling the amount of power or the like supplied to the plasma generation device depending on the operating conditions of the internal combustion engine. However, since the above methods do not directly detect the reaction conditions in the plasma generation device, problems exist such as occurrence of control delay or necessity of a control margin.

The present invention has been achieved in view of the above-described problems. An object of the present invention is to provide a plasma reactor which can effectively process exhaust gas without supplying energy exceeding a necessary level.

In order to achieve the above object, the present invention provides the following plasma reactor.

[1] A plasma reactor comprising a plasma generating electrode which includes a plurality of unit electrodes hierarchically layered at specific intervals, a casing in which the plasma generating electrode is disposed, and a power supply which applies a voltage to the unit electrodes, generating plasma in a space formed between the unit electrodes by applying a pulse voltage between the unit electrodes from the power supply, and capable of processing exhaust gas introduced into the space via reaction, the plasma reactor further comprising: a light-transmitting section formed in the casing for externally detecting light emitted by the plasma; light detection means capable of detecting light emitted by the plasma through the light-transmitting section formed in the casing; and control means for controlling electric energy applied to the unit electrodes depending on intensity of light detected by the light detection means.

[2] The plasma reactor according to [1], wherein the light detection means detects light due to atomic nitrogen radicals, molecular nitrogen radicals, atomic oxygen radicals, and molecular oxygen radicals contained in light emitted by the plasma.

[3] The plasma reactor according to [1] or [2], wherein the light detection means includes a grating, a lens, and a photodetector and is formed so that the grating disperses incident light into a spectrum, the lens focuses the resulting light at each wavelength, and the photodetector receives light at a specific wavelength to detect the intensity of the light.

[4] The plasma reactor according to [3], wherein the light detection means further includes a second lens which condenses the incident light onto the grating.

[5] The plasma reactor according to any one of [1] to [3], wherein the casing includes an external lens provided in the light-transmitting section, and the external lens focuses light emitted by the plasma onto the light detection means.

Since the plasma reactor according to the present invention includes the light detection means capable of detecting light emitted by plasma and the control means for controlling electric energy applied to the unit electrodes depending on the intensity of light detected by the light detection means, energy supplied to the unit electrodes can be controlled while directly detecting the reaction state of exhaust gas in the plasma generating electrode, whereby exhaust gas can be effectively processed without supplying energy exceeding a necessary level.

DETAILED DESCRIPTION OF PREFERRED EMBODIMENTS

Embodiments of the present invention are described below in detail with reference to the drawings. Note that the present invention is not limited to the following embodiments. Various modifications and improvements of the design may be made without departing from the scope of the present invention based on common knowledge of a person skilled in the art. In each drawing, identical elements are indicated by identical symbols.

Figure 1:
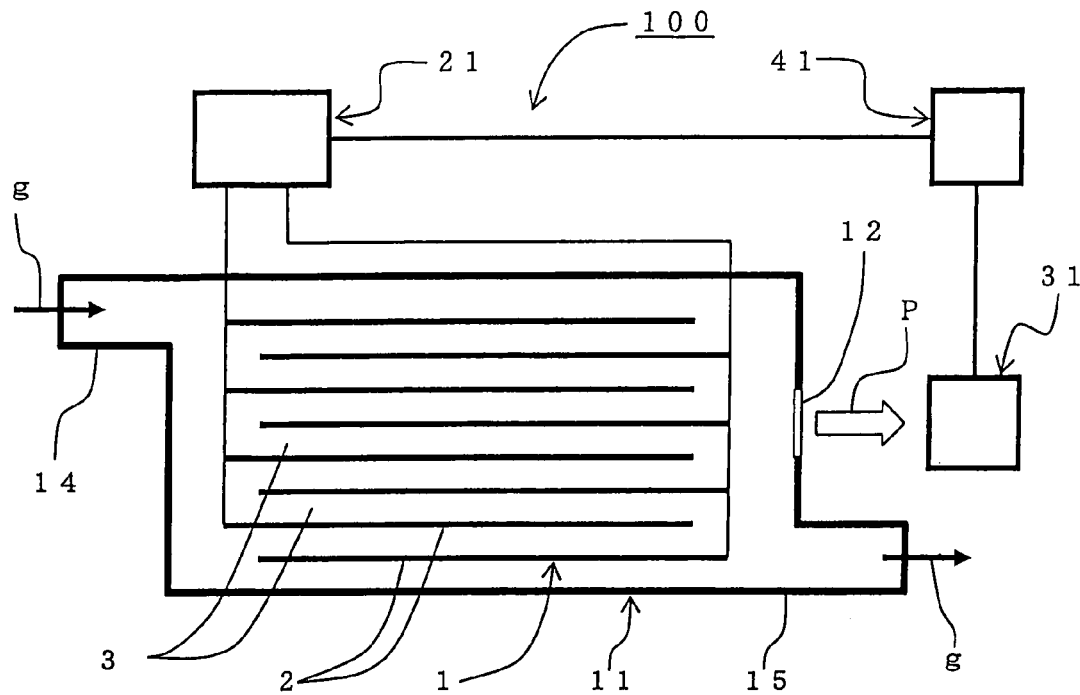
FIG. 1 is a schematic view showing one embodiment of a plasma reactor according to the present invention.

FIG. 1 is a schematic view showing one embodiment of a plasma reactor according to the present invention. As shown in FIG. 1, a plasma reactor 100 according to this embodiment includes a plasma generating electrode 1 which includes a plurality of unit electrodes 2 hierarchically layered at specific intervals, a casing 11 in which the plasma generating electrode 1 is disposed, and a power supply 21 which applies a voltage to the unit electrodes 2, generates plasma in a space 3 formed between the unit electrodes 2 by applying a pulse voltage between the unit electrodes 2 from the power supply 21, and is capable of processing exhaust gas introduced into the space 3 through reaction. The plasma reactor 100 according to this embodiment further includes a light-transmitting section 12 formed in the casing 11 for externally detecting light emitted by plasma, light detection means 31 capable of detecting light emitted by plasma through the light-transmitting section 12 formed in the casing 11, and control means 41 for controlling electric energy applied to the unit electrodes 2 depending on intensity of light detected by the light detection means 31. The light detection means 31 and the control means 41, the control means 41 and the power supply 21, and the power supply 21 and the unit electrodes 2 are electrically connected, respectively.

Since the plasma reactor according to this embodiment includes the light detection means capable of detecting light emitted by plasma and the control means for controlling electric energy applied to the unit electrodes depending on the intensity of light detected by the light detection means, electric energy (energy supply) applied to the unit electrodes can be controlled while directly detecting light emitted by plasma. This makes it possible to control the energy supplied to the plasma generating electrode while directly detecting the reaction state of exhaust gas in the plasma generating electrode, whereby exhaust gas can be effectively processed without supplying energy in excess.

In the case of processing particulate matter through reaction using the plasma reactor according to this embodiment, the spectral intensity of each wavelength of light emitted by plasma differs when the particulate matter is insufficiently processed due to insufficient energy supply (electric energy), when the particulate matter is sufficiently processed due to moderate energy supply, and when the particulate matter is sufficiently processed due to energy supply in excess of the moderate level. For example, when the energy supply is in excess of the moderate level, emission of light due to atomic oxygen radicals and molecular oxygen radicals is enhanced. On the other hand, when the particulate matter is insufficiently processed due to insufficient energy supply, emission of light due to atomic oxygen radicals and molecular oxygen radicals is reduced. Since nitrogen molecules stably exist inside the plasma reactor and show a specific spectral intensity irrespective of the amount of energy supply, a change in emission of light due to other radicals can be confirmed with reference to emission of light due to atomic nitrogen radicals and molecular nitrogen radicals. In the plasma reactor according to this embodiment, it is preferable that the light detection means detect light emitted due to atomic nitrogen radicals, molecular nitrogen radicals, atomic oxygen radicals, and molecular oxygen radicals contained in light emitted by plasma, and the control means then control electric energy applied to the unit electrodes of the plasma generating electrode. In more detail, the light detection means detects an emission spectrum at wavelengths of around 777 nm, around 845 nm, and around 926 nm due to atomic oxygen radicals, an emission spectrum at a wavelength of around 761 nm due to molecular oxygen radicals, and an emission spectrum at a wavelength of around 350 nm due to atomic nitrogen radicals and molecular nitrogen radicals, and the control means compares the spectral intensities of the respective wavelengths to determine whether or not the energy supply is sufficient, and directs the power supply to adjust the energy supply, if necessary. Alternatively, only the intensity ratio of the emission spectra due to atomic oxygen radicals and molecular oxygen radicals may be detected, and the energy supply may be adjusted corresponding to a change in the intensity ratio. Note that the term "around" used herein regarding the above wavelength means a range of ±10 nm of the wavelength.

As shown in FIG. 1, the light-transmitting section 12 for externally detecting light emitted by plasma is provided in the casing 11 forming the plasma reactor 100 according to this embodiment. It is preferable that the light-transmitting section 12 be formed by creating an opening in part of the casing 11 and filling the opening with quartz, heat-resistant glass, heat-resistant resin, or the like which transmits light in the above wavelength band (detection wavelength band). It is preferable that the light-transmitting section 12 be disposed at a position which allows light emitted by plasma to be easily confirmed from the outside. The dimensions of the light-transmitting section 12 are not particularly limited. It suffices that the light-transmitting section 12 have dimensions which allow light released to the outside to be detected by the light detection means so that a change in intensity can be confirmed.

As shown in FIG. 1, the casing 11 includes a inlet port 14 through which exhaust gas g flows into the casing 11, and an outlet port 15 through which the exhaust gas g which has been processed while passing through the space between the unit electrodes flows out from the casing 11. The material for the casing 11 is not particularly limited. For example, it is preferable to use ferrite-type stainless steel or the like which exhibits excellent conductivity, is lightweight and inexpensive, and shows only a small amount of deformation due to thermal expansion.

Figure 2:
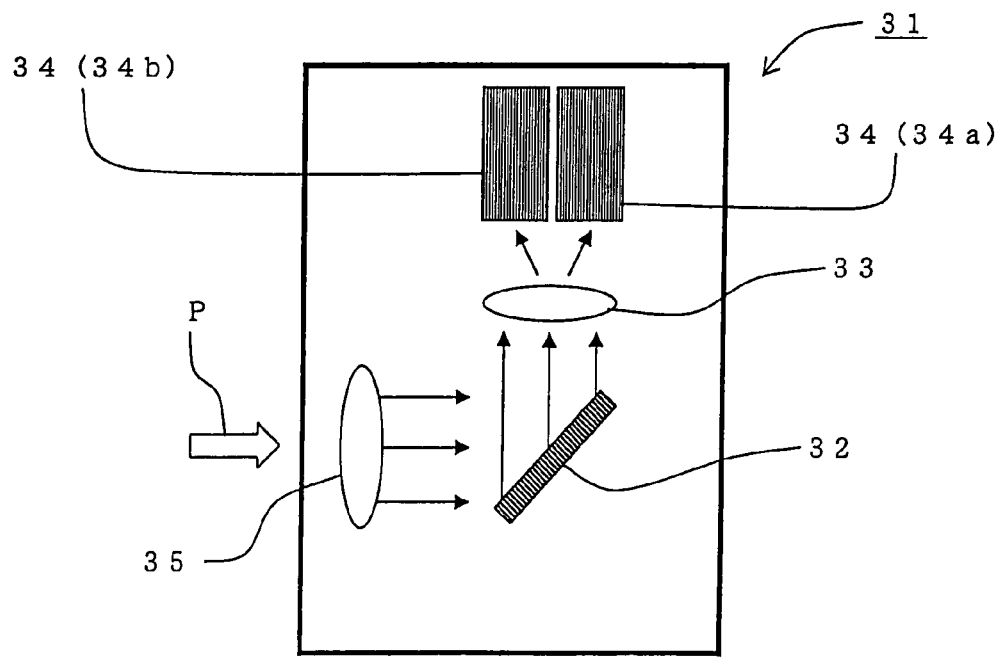
FIG. 2 is a schematic view showing a light detection device forming one embodiment of the plasma reactor according to the present invention.

As shown in FIG. 1, the light detection means 31 is positioned to detect light emitted by plasma through the light-transmitting section 12 in the casing 11. As shown in FIG. 2, the light detection means 31 includes a grating (reflection grating) 32, a lens 33, a second lens 35, and two photodetectors 34 (34a and 34b). These elements are accommodated in a casing made of a metal, a resin, or the like. It is preferable that an opening for introducing light P be formed in the casing. The number of photodetectors 34 is not limited to two. The number of photodetectors 34 may be appropriately selected depending on the number of wavelengths of light to be received. When light (light P) emitted due to plasma which has exited through the light-transmitting section 12 is incident upon the light detection means 31, the second lens 35 condenses the incident light P onto the grating 32, the grating 32 disperses the light P into a spectrum, the lens 33 focuses the resulting light P at each wavelength, and each photodetector 34 (34a and 34b) receives the light at a specific wavelength corresponding to its position to detect the intensity of the light at each specific wavelength. It is preferable that the light detection means 31 include the second lens 35 since the incident light P can be always stably dispersed and detected. In this embodiment, the second lens 35 condenses the light P before the light P enters the grating 32. When the photodetector 34 can receive sufficient light P without using the second lens 35, the light detection means 31 need not necessarily include the second lens. In addition, when the light-transmitting section 12 is provided with an external lens 13 as in another embodiment of the plasma reactor according to the present invention shown in FIG. 3, the light detection means 31 need not necessarily include the second lens. It is preferable that the external lens 13 be formed of quartz, heat-resistant glass, heat-resistant resin, or the like which transmits light in the above wavelength band (detection wavelength band).

When detecting light due to atomic nitrogen radicals, molecular nitrogen radicals, atomic oxygen radicals, and molecular oxygen radicals using the light detection means 31, it is preferable to dispose the photodetector 34a at a position at which the photodetector 34a can effectively receive light at a wavelength of around 850 nm, and dispose the photodetector 34b at a position at which the photodetector 34b can effectively receive light at a wavelength of around 350 nm. This allows emission spectra due to atomic oxygen radicals and molecular oxygen radicals to be effectively received by the photodetector 34a, and allows emission spectra due to atomic nitrogen radicals and molecular nitrogen radicals to be effectively received by the photodetector 34b. As the photodetector 34, an SiPIN photodiode, a GaAs photodiode, a GaN photodiode, or the like is preferable which is capable of detecting light at a wavelength of around 850 nm and 350 nm. Since the response speed of the photodetector 34 does not cause a significant problem, a photodetector with a large diameter is preferable.

The size, refractive index, material, and the like of the lens 33 are not particularly limited insofar as the light dispersed by the grating 32 can be effectively focused onto the photodetector 34. It is preferable that the lens 33 be formed of quartz, heat-resistant glass, heat-resistant resin, or the like which transmits light in the above wavelength band (detection wavelength band). Likewise, the second lens 35 is not particularly limited insofar as the light P can be effectively condensed onto the grating 32. It is preferable that the second lens 35 be formed of quartz, heat-resistant glass, heat-resistant resin, or the like which transmits light in the above wavelength band (detection wavelength band).

As the grating 32, it is preferable to use a grating formed by creating a pattern on a material such as quartz using photo-etching technology. If necessary, a grating may be used which is formed by providing a reflective film on the surface of a grating to improve reflectance.

In the plasma reactor 100 according to this embodiment, the control means 41 controls electric energy applied to the unit electrodes 2 depending on the intensity of light detected by the light detection means 31. The control means 41 determines whether or not the energy supply is appropriate based on a signal of spectral intensity transmitted from the detection means 31, and directs the power supply 21 to increase, decrease, or maintain the energy supply based on the determination results. A signal transmitted from the detection means 31 is preferably amplified by an amplifier and transmitted to the control means 41. The amplifier may be connected between the detection means 31 and the control means 41, or may be included in the control means 41.

For example, the ratio ($I_{850}/I_{350}$) of a spectral intensity $I_{850}$ at a wavelength of around 850 nm when particulate matter is appropriately processed and the amount of energy supply is appropriate and a spectral intensity $I_{350}$ at a wavelength of around 350 nm is input in advance to the control means 41 as a reference range (reference value), and the control means 41 calculates the ratio "$I_{850}/I_{350}$" for each intensity data transmitted from the light detection means 31, and compares the ratio with the reference value. When the calculated value is greater than the reference value to indicate that the energy supply is too great, the control means 41 directs the power supply 21 to reduce the energy supply. When the calculated value is smaller than the reference value to indicate that the energy supply is too small, the control means 41 directs the power supply 21 to increase the energy supply. When the calculated value is within the range of the reference value to indicate that the plasma reactor is appropriately operated, the control means 41 maintains the current state without changing the energy supply.

When controlling the electric energy applied to the unit electrodes of the plasma generating electrode by detecting the spectral intensity $I_{850}$ at a wavelength of around 850 nm and the spectral intensity $I_{350}$ at a wavelength of around 350 nm, since the reference range (reference value) of the ratio $I_{850}/I_{350}$ varies to a large extent depending on the sensitivity of the light-receiving element (photodiode) used, it is preferable to collect soot using filter paper or the like in the subsequent stage of the plasma reactor and make determinations while confirming the soot processing state.

An engine control unit (ECU) may be used as the control means 41. Note that it is preferable to use a control electronic circuit independent of the ECU.

In the plasma reactor 100 according to this embodiment, the power supply 21 is not particularly limited insofar as the power supply 21 can apply a pulse voltage. The energy supply when applying a pulse voltage using the power supply 21 is preferably controlled in the range of 10 to 300 mJ per pulse.

Figure 3:
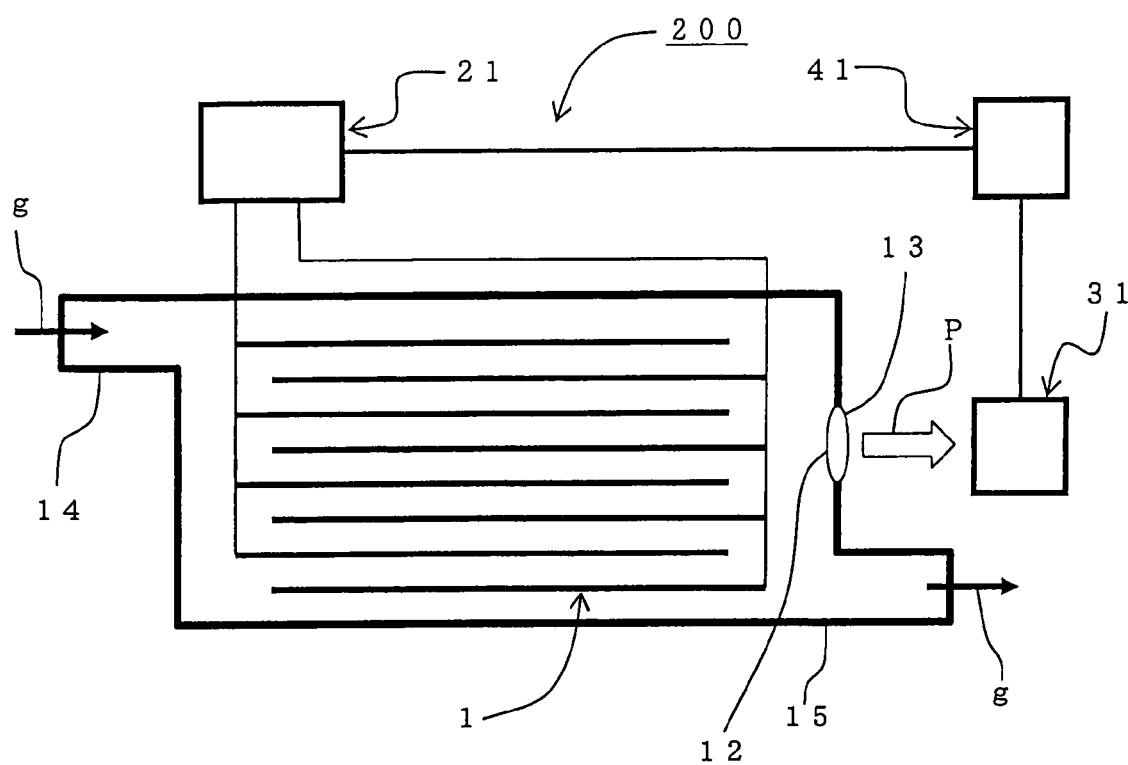
FIG. 3 is a schematic view showing another embodiment of the plasma reactor according to the present invention.

FIG. 3 is a schematic view showing another embodiment of the plasma reactor according to the present invention. In a plasma reactor 200 according to this embodiment, an external lens 13 is provided in the light-transmitting section 12 formed in the casing 11, as shown in FIG. 3. The remaining elements are similar to those of the one embodiment of the present invention described above. According to this embodiment, since the external lens 13 is provided in the light-transmitting section 12, light emitted by plasma is focused by the external lens 13 and is incident upon the light detection means 31. Therefore, the light detection means 31 need not necessarily include the second lens, whereby a small light detection means 31 can be formed.

In the plasma reactor 100 according to this embodiment, the plasma generating electrode 1 is formed by hierarchically layering a plurality of unit electrodes 2 at specific intervals.

The unit electrode 2 forming the plasma generating electrode 1 is not particularly limited insofar as plasma can be generated in the space 3 between the unit electrodes 2 when applying a pulse voltage. As an example of the unit electrode 2, a unit electrode formed of a sheet-shaped dielectric and a conductive film disposed in the dielectric can be given. The dielectric may be disposed on each side of the conductive film, or the dielectric may be disposed on only one side of the conductive film. It is preferable that the unit electrodes 2 be layered so that the dielectric is positioned between the conductive films of opposing unit electrodes 2. When the dielectric is disposed on the surface of one of a pair of opposing conductive films, a local discharge such as an arc discharge can be reduced in comparison with the case of causing a discharge using only the conductive films, whereby a small discharge can be caused to occur at multiple locations. Since such a small discharge involves a small amount of current in comparison with an arc discharge or the like, power consumption can be reduced. Moreover, current flowing between the unit electrodes 2 is limited due to the presence of the dielectric, whereby nonthermal plasma can be generated which does not involve an increase in temperature and consumes only a small amount of energy.

The distance between the adjacent unit electrodes 2 of the plasma generating electrode 1 is preferably 0.2 to 3 mm, and more preferably 0.5 to 1.0 mm.

In this embodiment, when forming the unit electrode 2 using the dielectric and the conductive film, the thickness of the conductive film is preferably 0.001 to 0.1 mm, and more preferably 0.005 to 0.05 mm in order to reduce the size of the plasma generating electrode 1 and to reduce the resistance of the processing target fluid which is caused to pass through the space between the unit electrodes 2 when processing exhaust gas or the like.

The conductive film used in this embodiment preferably includes a metal exhibiting excellent conductivity as the main component. As preferred examples of the main component of the conductive film, at least one metal selected from the group consisting of tungsten, molybdenum, manganese, chromium, titanium, zirconium, nickel, iron, silver, copper, platinum, and palladium can be given. In this embodiment, the term "main component" refers to a component accounting for 60 mass % or more of the components of the conductive film.

It is preferable that the conductive film of the unit electrode 2 be disposed on the dielectric by coating. As preferred examples of the coating method, printing, rolling, spraying, electrostatic painting, dipping, knife coating, and the like can be given. According to these methods, a thin conductive film exhibiting excellent surface flatness (smoothness) after application can be easily formed. In this case, it is preferable to use a sheet-shaped ceramic body as the dielectric.

It is preferable that the dielectric forming the unit electrode 2 be a sheet-shaped ceramic body formed using a material with a high dielectric constant as the main component. As the material for the sheet-shaped ceramic body, aluminum oxide, zirconium oxide, silicon oxide, mullite, cordierite, titanium-barium type oxide, magnesium-calcium-titanium type oxide, barium-titanium-zinc type oxide, silicon nitride, aluminum nitride, or the like may be suitably used. It is preferable to appropriately select a material suitable for generating plasma suitable for PM reaction from these materials and form the dielectric using the selected material. The plasma generating electrode can be operated under high temperature conditions using a material exhibiting excellent thermal shock resistance as the main component of the dielectric.

For example, copper metallization technology may be used for a low-temperature fired substrate material (low-temperature cofired ceramic: LTCC) in which a glass component is added to aluminum oxide ($Al_2O_3$). The use of the copper metallization technology enables formation of an electrode exhibiting a low resistance and high discharge efficiency, whereby the size of the electrode can be reduced. This enables design which prevents thermal stress, whereby a low strength problem can be solved. When forming the electrode using a high-dielectric-constant material such as barium titanate, magnesium-calcium-titanium type oxide, or barium-titanium-zinc type oxide, the size of the electrode can be reduced due to high discharge efficiency. Therefore, structural design can be achieved which can reduce occurrence of thermal stress due to high thermal expansion.

The thickness of the dielectric 3 is not particularly limited. The thickness of the dielectric 3 is preferably 0.1 to 3 mm. If the thickness of the dielectric 3 is less than 0.1 mm, electrical insulation between a pair of adjacent unit electrodes 2 may not be ensured. If the thickness of the dielectric 3 exceeds 3 mm, a reduction in size of an exhaust gas purifying device may be hindered. Moreover, the applied voltage must be increased due to an increase in the electrode-to-electrode distance, whereby efficiency may be decreased.

A method of manufacturing the plasma reactor according to one embodiment of the present invention is described below in detail.

The plasma generating electrode forming the plasma reactor is produced. A ceramic green sheet used as the sheet-shaped ceramic body is formed. For example, a sintering agent, a binder such as a butyral resin or a cellulose resin, a plasticizer such as DOP or DBP, an organic solvent such as toluene or butadiene, and the like are added to at least one material selected from the group consisting of alumina, mullite, cordierite, mullite, silicon nitride, aluminum nitride, ceramic glass, and glass. The components are sufficiently mixed using an alumina pot and alumina cobblestone to prepare a green sheet slurry. A green sheet slurry may be prepared by mixing these materials by ball milling using a mono ball.

The resulting green sheet slurry is stirred under reduced pressure to remove bubbles, and adjusted to a specific viscosity. The green sheet slurry thus prepared is formed in the shape of a tape using a tape forming method such as a doctor blade method to form a plurality of types of unfired ceramic bodies.

A conductive paste for forming a conductive film disposed on one surface of the resulting unfired ceramic body is prepared. The conductive paste may be prepared by adding a binder and a solvent such as terpineol to silver powder and sufficiently kneading the mixture using a triple roll mill, for example.

The resulting conductive paste is printed on the surface of one unfired ceramic body by screen printing or the like to form a conductive film with a specific shape to obtain a conductive film-containing unfired ceramic body. In order to supply electricity to the conductive film from the outside of the unit electrode after forming the unit electrode by holding the conductive film between the ceramic bodies, the conductive paste is preferably printed so that the conductive film reaches the outer edge of the unfired ceramic body.

The conductive film-containing unfired ceramic body and another unfired ceramic body are stacked so that the printed conductive film is covered. It is preferable to stack the unfired ceramic bodies at a temperature of 100° C. while applying a pressure of 10 MPa. Then, the unfired ceramic bodies stacked in a state in which the conductive film is held therebetween are fired to form a unit electrode including the sheet-shaped ceramic body and the conductive film.

The unit electrodes thus formed are layered. In this case, in order to provide a specific interval between the unit electrodes, a ceramic rod in the shape of a quadrangular prism is formed using a raw material similar to that of the ceramic body and placed between the unit electrodes. The thickness of the ceramic rod corresponds to the distance between the unit electrodes. The ceramic rods are placed between the unit electrodes so that the ceramic rods are disposed in parallel to provide gas passages when processing exhaust gas or the like. The ceramic rod need not be in the shape of a quadrangular prism, and may be in the shape of a cylinder, a prism other than a quadrangular prism, or another prism shape. A plurality of protrusions may be formed on one surface of the ceramic body, and a space may be formed by disposing the unit electrodes with the protrusions interposed therebetween. Recesses and protrusions may be formed in and on the ceramic bodies, and a space may be formed by engaging the recesses and the protrusions. As described above, the plasma generating electrode forming the plasma reactor according to this embodiment can be obtained by hierarchically layering the unit electrodes through the ceramic rods.

The casing forming the plasma reactor according to this embodiment may be obtained by forming ferrite-type stainless steel or the like into a tube having the gas inlet port 14 and the gas outlet port 15 shown in FIG. 1 on opposite ends, for example. The light-transmitting section 12 is formed at a position at which light emitted by plasma can be easily confirmed from the outside. It is preferable to form the casing 11 so that the casing 11 can be divided into two or more sections in order to insert the plasma generating electrode into the casing 11. The light-transmitting section 12 is preferably formed of quartz, heat-resistant glass, heat-resistant resin, or the like which transmits light in the detection wavelength band.

As shown in FIG. 2, the light detection means is preferably formed by placing the grating (reflection grating) 32, the lens 33, the second lens 35, and two photodetectors 34 (34a and 34b) in a casing made of a metal, a resin, or the like. When assembling the light detection means 31, it is preferable to dispose each element in the casing so that, when light (light P) emitted due to plasma which has exited the casing through the light-transmitting section 12 has entered the light detection means 31, the second lens 35 condenses the entered light P onto the grating 32, the grating 32 disperses the light P into a spectrum, the lens 33 focuses the resulting light P at each wavelength, and each light-receiving element 34 (34a and 34b) receives the light at a specific wavelength corresponding to its position. The lens 33 and the second lens 35 are preferably formed of quartz, heat-resistant glass, heat-resistant resin, or the like which transmits light in the detection wavelength band.

As the control means 41, it is preferable to use a control electronic circuit or the like independent of an ECU.

As the power supply, it is preferable to utilize a pulsed power supply using an SI thyristor or the like.

The plasma generating electrode is installed in the casing, the specific power supply, the control means, and the light detection means are connected, and the light detection means is disposed at a position at which the light detection means easily detects light emitted by plasma through the light-transmitting section formed in the casing to obtain the plasma reactor according to this embodiment 100, as shown in FIG. 1.

EXAMPLES

The present invention is described below in more detail by way of examples. Note that the present invention is not limited to the following examples.

Example 1

A plasma reactor was produced having a configuration as shown in FIG. 1 in which the number of unit electrodes was increased. Exhaust gas containing PM was processed, and the amount of power required to achieve a PM removal rate of 98% was measured.

A plasma generating electrode used in the plasma reactor according to this example was produced as follows. A tungsten paste was screen-printed to a thickness of 10 μm on the surface of an unfired green sheet with a thickness of 0.6 mm to form a conductive film, and an unfired green sheet with a thickness of 0.6 mm was provided to cover the conductive film to produce a unit electrode. Seventy unit electrodes were produced and layered to produce a plasma generating electrode in which the unit electrodes were layered in 70 stages. The distance between the unit electrodes was 0.4 mm. The outer circumference of the resulting plasma generating electrode was secured using a heat-resistant mat, and the plasma generating electrode was placed in a casing made of 430SS in which an inlet port, an outlet port, and a light-transmitting section were formed. A pulsed power supply, control means, and light detection means were connected with the plasma generating electrode placed in the casing to produce a plasma reactor.

A pulsed power supply using an SI thyristor was used. The unit electrodes in 70 stages were alternately connected with the pulsed power supply and grounded. A control electronic circuit was used as the control means. The light detection means was formed by placing the grating (reflection grating) 32, the lens 33, the second lens 35, and the two photodetectors 34 (34a and 34b) in a metal casing made, as shown in FIG. 2. An opening for introducing the light P was formed in the casing. As the photodetectors, an SiPIN photodiode capable of detecting light at a wavelength of around 350 nm and an SiPIN photodiode capable of detecting light at a wavelength of around 850 nm were used. One of the photodetectors was disposed at a position at which the photodetector can effectively receive light at a wavelength of around 850 nm, and the other photodetector was disposed at a position at which the photodetector can effectively receive light at a wavelength of around 350 nm.

The resulting plasma reactor was connected with a diesel engine, and particulate matter was processed in the New European Driving Cycle (NEDC) mode. The plasma reactor was operated so that the intensities ($I_{850}$ and $I_{350}$) of light detected by the two photodetectors were always within the reference range during processing. The average amount of power (W) required to remove 98% of particulate matter was measured. The results are shown in Table 1.

Comparative Example 1

A plasma reactor was produced in the same manner as in Example 1 except that the light detection means and the control means were not used.

The resulting plasma reactor was connected with a diesel engine, and particulate matter was processed in the New European Driving Cycle (NEDC) mode. In the plasma reactor according to Comparative Example 1, the amount of particulate matter corresponding to the engine speed and the torque was confirmed in advance, and electric energy required to process the corresponding amount of particulate matter was applied to the plasma generating electrode depending on the engine speed and the torque during the test. The average amount of power (W) required to remove 98% of particulate matter was measured. The results are shown in Table 1.

TABLE 1

| | Power (W) |
|---|---|
| Example 1 | 350 |
| Comparative Example 1 | 450 |

As shown in Table 1, since the amount of power supplied was controlled in the plasma reactor according to Example 1 while detecting light emitted by plasma, the amount of power supplied is smaller than that of the plasma reactor according to Comparative Example 1.

The plasma reactor according to the present invention may be utilized to remove particulate matter produced from an internal combustion engine such as a diesel engine. In particular, the plasma reactor according to the present invention may be suitably utilized as a plasma reactor which can effectively process particulate matter contained in exhaust gas without supplying energy exceeding a necessary level.

What is claimed is:

1. A plasma reactor comprising:
   a plasma generating electrode which includes a plurality of unit electrodes hierarchically layered at specific intervals,
   a casing in which the plasma generating electrode is disposed, and
   a power supply which applies a voltage to the unit electrodes,
   generating plasma in a space formed between the unit electrodes by applying a pulse voltage between the unit electrodes from the power supply, and capable of processing exhaust gas introduced into the space via reaction,
   the plasma reactor further comprising:
   a light-transmitting section formed in the casing for externally detecting light emitted by the plasma;
   light detection means capable of detecting light emitted by the plasma through the light-transmitting section formed in the casing; and
   control means for controlling electric energy applied to the unit electrodes depending on intensity of light detected by the light detection means.

2. The plasma reactor according to claim 1, wherein the light detection means detects light due to atomic nitrogen radicals, molecular nitrogen radicals, atomic oxygen radicals, and molecular oxygen radicals contained in light emitted by the plasma.

3. The plasma reactor according to claim 1, wherein the light detection means includes a grating, a lens, and a photodetector and is formed so that the grating disperses incident light into a spectrum, the lens focuses the resulting light at each wavelength, and the photodetector receives light at a specific wavelength to detect the intensity of the light.

4. The plasma reactor according to claim 3, wherein the light detection means further includes a second lens which condenses the incident light onto the grating.

5. The plasma reactor according to claim 1, wherein the casing includes an external lens provided in the light-transmitting section, and the external lens focuses light emitted by the plasma onto the light detection means.

* * * * *